May 21, 1963 W. E. FOX 3,090,273
MUSICAL SWING
Filed Aug. 5, 1960 5 Sheets-Sheet 1
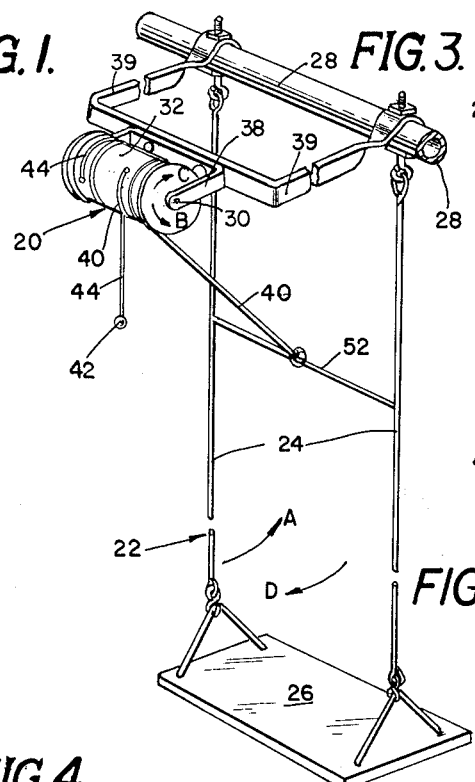
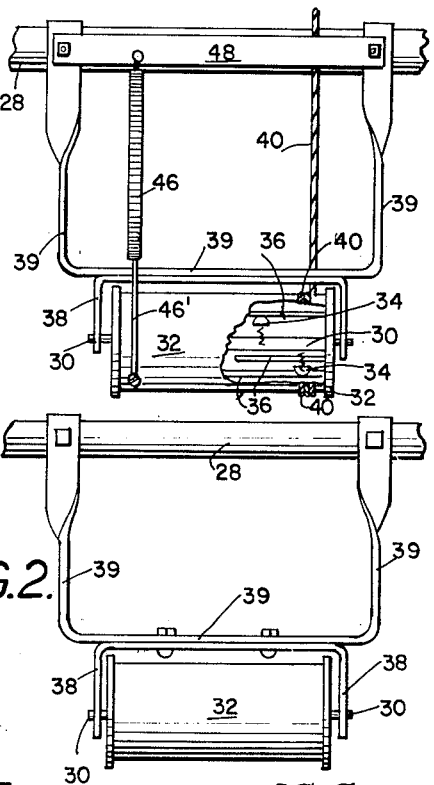
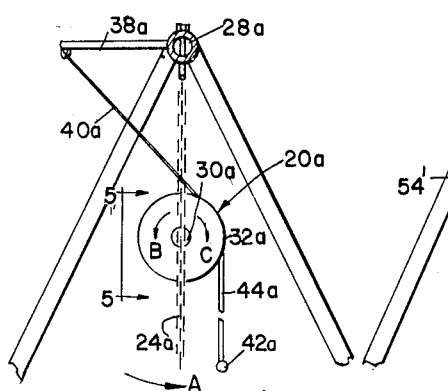
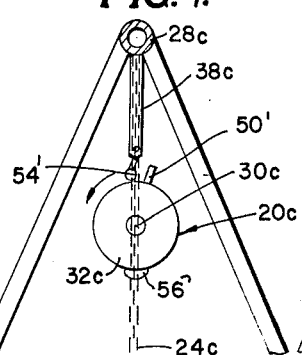
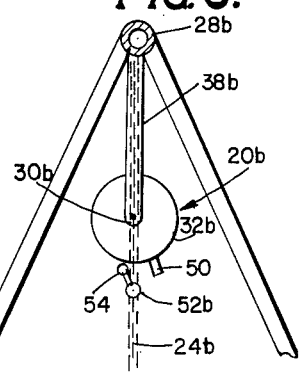
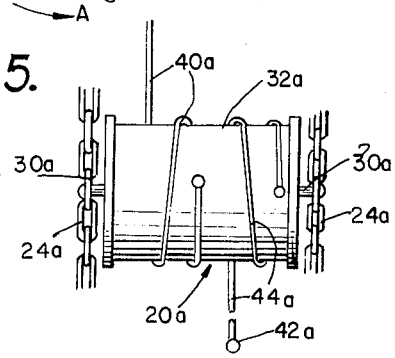
INVENTOR
WALTER E. FOX
BY Cushman, Darby & Cushman
ATTORNEYS May 21, 1963
W. E. FOX
3,090,273
MUSICAL SWING
Filed Aug. 5, 1960
5 Sheets-Sheet 2
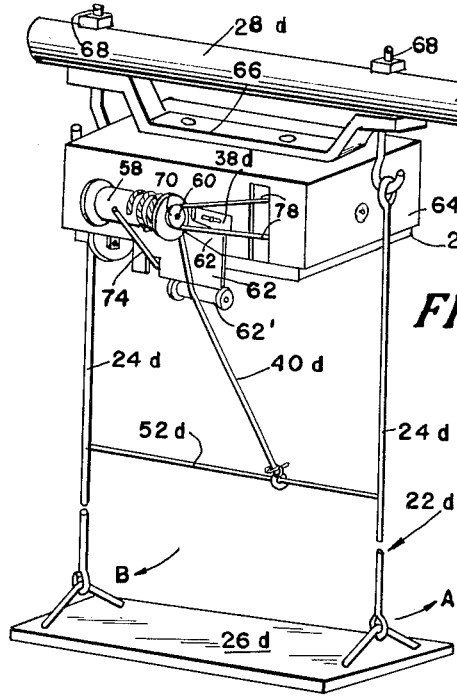
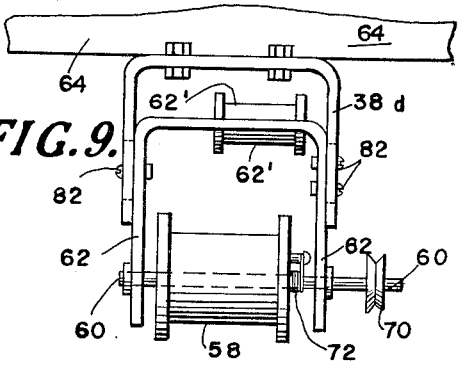
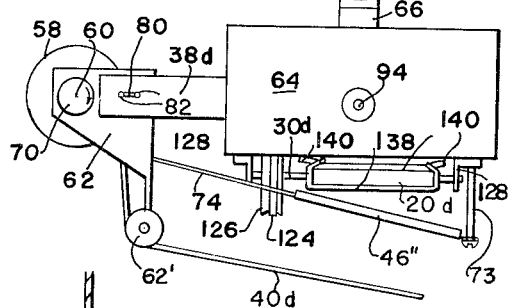
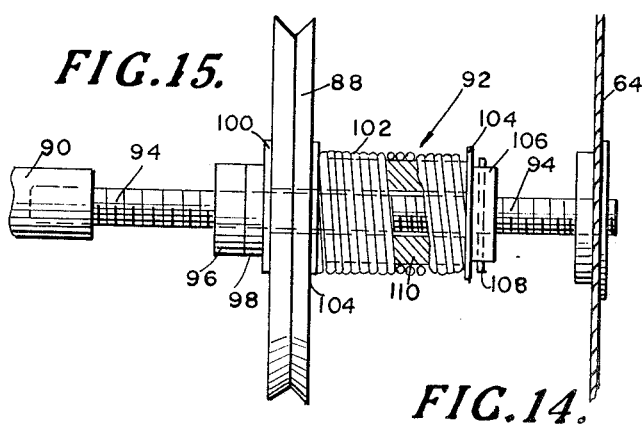
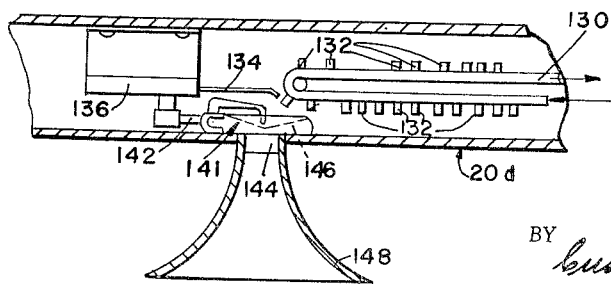
INVENTOR
WALTER E FOX
BY *Cushman, Darby & Cushman*
ATTORNEYS May 21, 1963 W. E. FOX 3,090,273
MUSICAL SWING
Filed Aug. 5, 1960 5 Sheets-Sheet 3
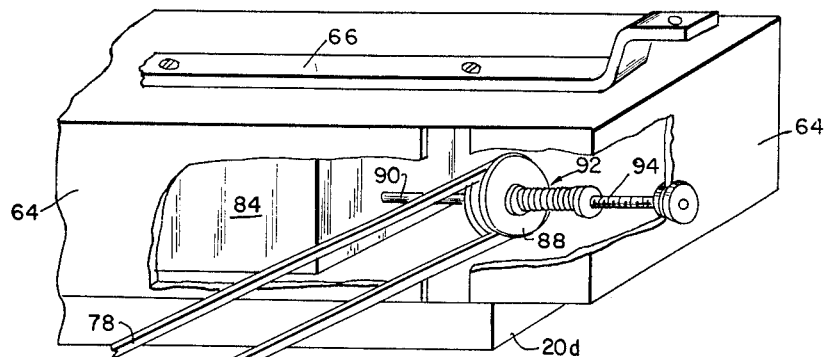
FIG. 11.
FIG. 12.
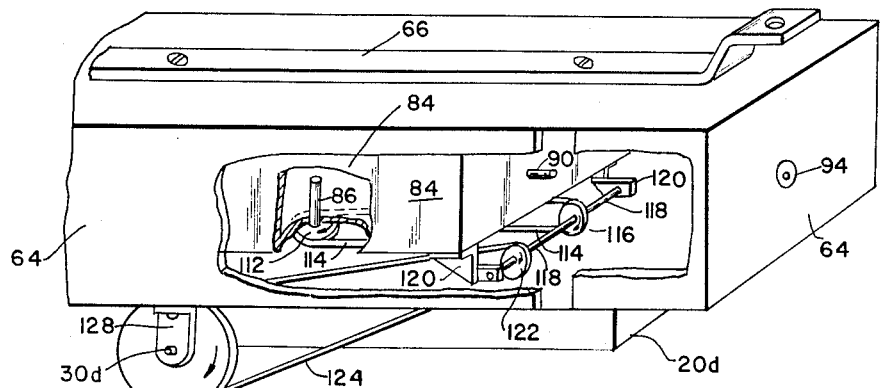
FIG. 13.
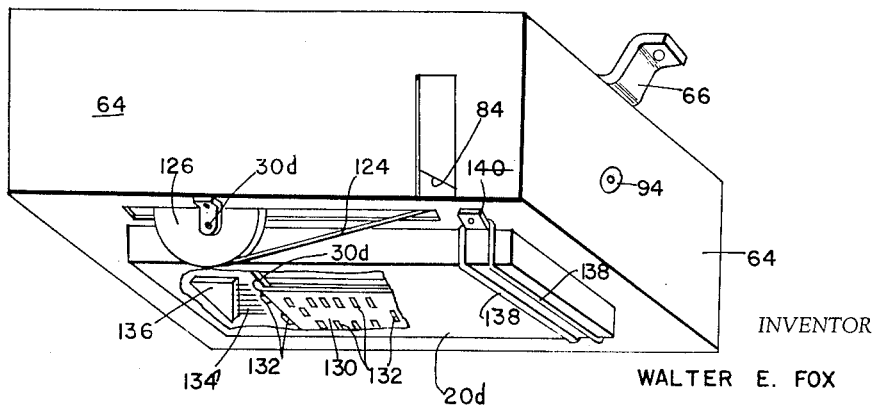
INVENTOR
WALTER E. FOX
BY Cushman, Darby & Cushman
ATTORNEYS

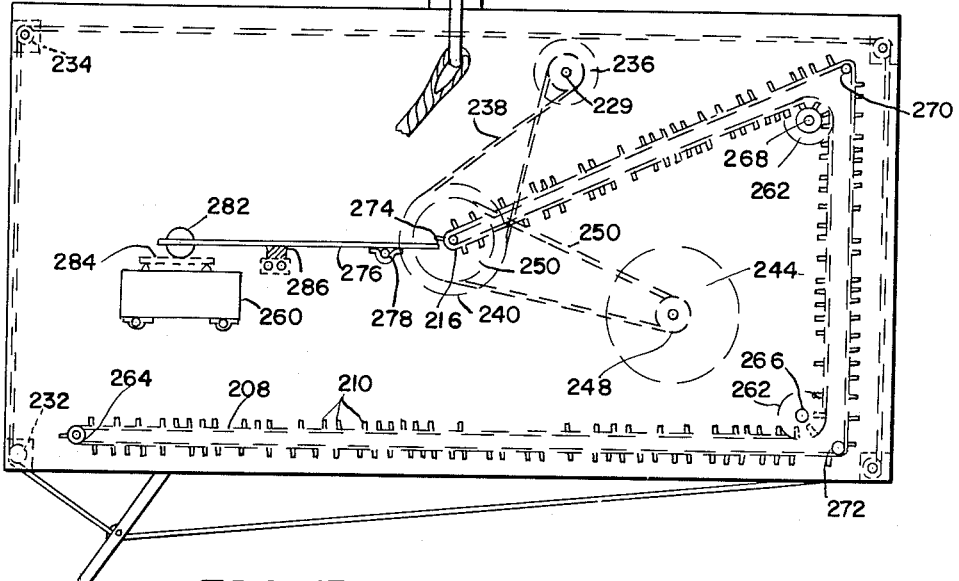
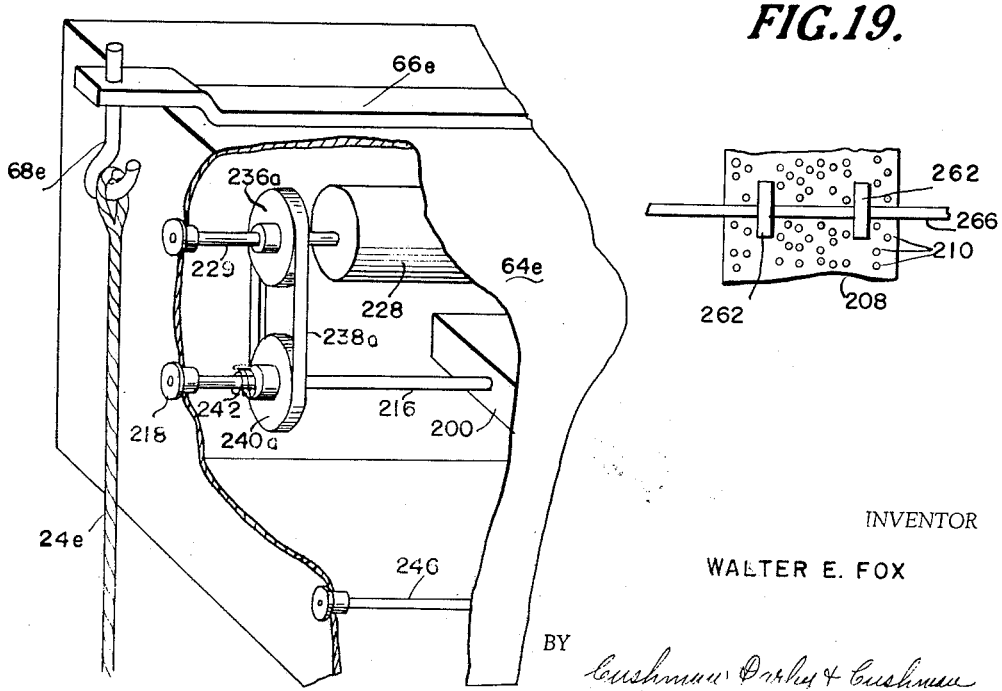

United States Patent Office 3,090,273
Patented May 21, 1963

3,090,273
MUSICAL SWING
Walter E. Fox, 703 Greenleaf Drive, Monroeville, Pa.
Filed Aug. 5, 1960, Ser. No. 47,769
5 Claims. (Cl. 84—94)

This invention relates to sound producing amusement devices for children and this application is a continuation-in-part of my copending application, Serial No. 805,057, now abandoned.

The main object of the invention is to provide a musical swing having an oscillatable seat or the like for children and adapted to produce pleasant sounds or music upon actuation of the seat.

Another object is to provide novel arrangements of sound producing devices in combination with playground swings, seesaws, or the like, for children whereby the sound producing means will be actuated or driven by normal operation of the swing or seesaw. A related and more specific object resides in the provision in such a combination of means for assuring that uniform undistorted and pleasant sounds emanate from the sound producing device irrespective of changes and variations in the velocity of movement of the swing or seesaw.

A more specific object of the invention is to provide in a sound producing device for use in combination with playground swings and the like apparatus, means for producing uniform undistorted and pleasing sounds irrespective of changes and variations in the velocity of movement of the swing and irrespective of the direction of its movement.

It is another object of this invention to provide a device of the character described having an increased number of tunes or melodies that may be produced thereby.

A further object resides in the provision of a novel, simplified and inexpensive sound producing attachment for playground swings or the like.

Other objects and advantages of the invention will become apparent from the following description and the accompanying drawings in which:

FIGURE 1 is a perspective view of one embodiment of the invention as applied to a playground swing;

FIGURE 2 is a top plan view, on enlarged scale, of the sound producing device shown in FIGURE 1;

FIGURE 3 is a view corresponding to FIGURE 2, partially cut away for illustrative purposes, and showing a modification of the means exerting a continuous biasing force on the sound producing device;

FIGURES 4, 6 and 7 are side elevational views of modifications of the structure shown in FIGURE 1;

FIGURE 5 is a view, on enlarged scale, taken generally in the direction of arrows 5—5 of FIGURE 4;

FIGURE 8 is a perspective view of a further modification of the structure shown in FIGURE 1;

FIGURE 9 is a fragmentary top plan view of a portion of the structure shown in FIGURE 8;

FIGURE 10 is an end view, on enlarged scale, of the embodiment shown in FIGURE 8, with certain structures being omitted for clarity of illustration, as will be evident;

FIGURE 11 is a fragmentary perspective view, on enlarged scale, of the sound producing device shown in FIGURE 8 and partially cut away to show internal structure;

FIGURE 12 is another view corresponding to FIGURE 11 and showing additional structure;

FIGURE 13 is a perspective and partially cut away view taken from the underside of the embodiment of the sound producing device shown in FIGURES 8–12;

FIGURE 14 is an enlarged and fragmentary longitudinal sectional view through a portion of the sound producing device of FIGURES 8–13 and showing structure for amplifying the sound;

FIGURE 15 is a side elevational view of an exemplary slip clutch arrangement shown in FIGURE 11;

FIGURE 17 is an enlarged perspective view, with parts cut away for clarity, of the right-hand portion of the device of FIGURE 16;

FIGURE 18 is an enlarged side sectional view in elevation looking from the left of FIGURE 16 and showing a modified mounting for the sound belt; and FIGURE 19 is a fragmentary view on enlarged scale showing a portion of the mounting means for the belt of FIGURE 18.

Figure 16:
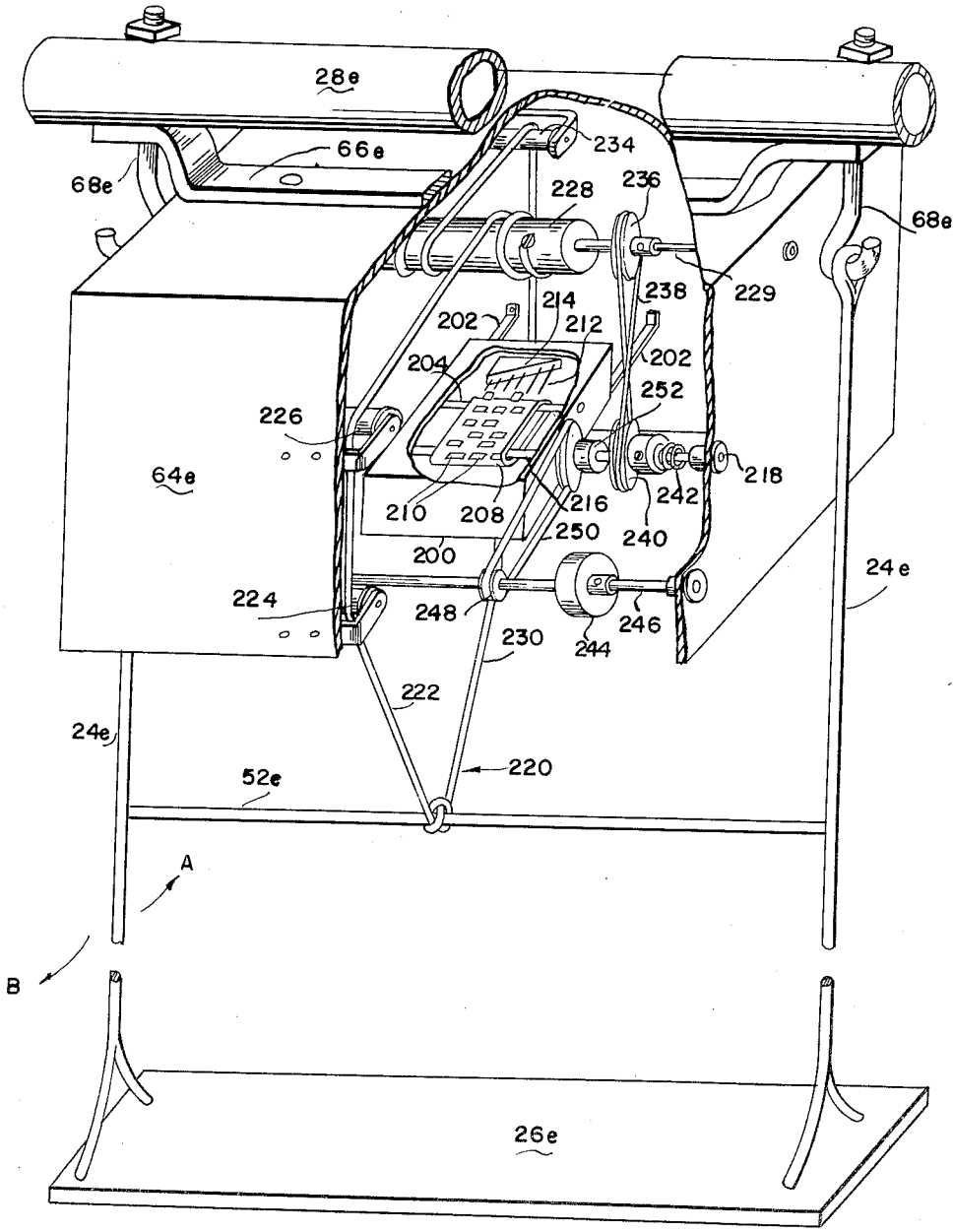
FIGURE 16 is a perspective view, with parts cut away for clarity, of a modification of the device of FIGURE 8.

Referring now to the drawings, FIGURES 1–3 illustrate one embodiment of my invention wherein a sound producing means 20 is shown drivingly connected to a playground swing 22. The swing 22 is shown as including conventional chains or ropes 24 and a seat 26, all being carried by a supporting frame engaged to the ground, as is understood. The ropes are connected at one end to the transverse bar 28 of the frame, and at the other end to the seat 26 in any suitable manner whereby the ropes and seat may be pivoted or oscillated generally about the axis of bar 28 in known manner. The frame and swing may be constructed of any appropriate materials, as is evident.

In accordance with my invention, I provide means for drivingly connecting the sound producing means 20 to the swing 22 so that the means 20 will be actuated by a child swinging on the swing.

The sound producing means 20 can be any conventional rotatable musical roller device wherein an outer member rotates around a central shaft to produce sounds. The one shown has a central shaft 30 and an outer drum or roller 32 rotatable relative to the shaft 30. Spring mounted hammers 34 are shown in FIGURE 3 as being carried by the shaft 30 to be struck by metal tines 36 extending inwardly from the ends of drum 32, as indicated in FIGURE 3. It will be understood that the roller 32 may be arranged to be stationary and the shaft 30 arranged to be rotated by the means to be later described for rotating the drum, if it is desired to reverse these parts in this manner. In either case, the relative motion between the shaft 30 and drum 32 will produce the musical sound.

In the embodiment of FIGURES 1–3, the shaft 30 is shown as being fixedly connected at its opposite ends to brace 38 which is fastened by brace 39 to bar 28, as shown. The drum 32 is mounted between the legs of brace 38 and is journalled to shaft 30.

The means for rotating the drum is shown in FIGURE 1 as including a cord or rope 40 or equivalent means connected at one end to the drum 32, wound around the drum and connected at the other end to a crossbar 52, suitably connected to the ropes 24. Hence, movement of the swing in the direction of arrow A (see FIGURE 1) will cause the cord 40 to unwind from the drum and at the same time rotate the drum in the direction of arrow B (see FIGURE 1) whereby the tines 36 on the drum will strike the spring mounted hammers 34 effecting the desired sounds or musical notes. It will be appreciated that the positions of hammers 34 and tines 36 may be reversed.

To effect movement of the drum 32 in the direction of arrow C (FIGURE 1) a weight 42 is shown as being carried by a second cord 44 connected to the drum and wound therearound at the other end of the drum and in a direction opposite to the direction of winding for the cord 40. With this arrangement, the weight 42 will move downwardly to rotate the drum in the direction of arrow C when the swing moves back in the direction of arrow D (FIGURE 1) thus causing the desired sounds or musical notes to be struck again.

FIGURE 3 shows a tension spring 46 connected at one end to a flat strip 48 which is fastened at both ends to the bracket 39, and at the other end, the spring 46 is connected to the drum 32 by means of a cord 46', to effect return movement of the drum in the direction of arrow C, as should be evident.

In either case, there will be a continuously acting biasing force on the drum urging it to rotate in the direction of arrow C. Thus, oscillation of the swing 22 by a child in the usual manner will effect corresponding oscillation of the drum 32 to produce the desired sounds, as is evident.

FIGURES 4 and 5 show a modification of the positioning of the drum 32 and related parts wherein similar reference numerals designate similar parts. In this modification, the drum 32a is arranged between the chains 24a of the swing, with the shaft 30a being fixedly connected to the chains. Cord 40a is connected at one end to the stationary brace 38a, while the weight 42a on the other cord 44a is again suspended from the drum. Operation of this modification should be apparent. Movement of swing 22 in the direction of arrow A causes cord 40a to unwind from the drum and at the same time effect rotation of the drum in the direction of arrow B. On the return movement of the swing, the weight 42a will effect rotation of the drum in the direction of arrow C.

Other modifications are shown in FIGURES 6 and 7 wherein similar reference numerals designate similar parts. In FIGURE 6, the shaft 30b of drum 32b is fixedly connected to stationary, transversely-spaced braces 38b depending from the bar 28b of the frame, and positioned between the chains 24b of the swing in straddling relationship to the drum 32b. On the underside of the drum, a heavy and generally vertical flap 50 is attached which also serves as the counterweight or biasing medium. A crossbar 52b extends between the chains and is attached thereto below the drum, with a hammer 54 being rigidly fastened to bar 52b to strike flap 50 and actuate the drum when the swing is operated, as will be evident. The counterweight 50 operates to return the drum to normal position after being struck by hammer 54, as is apparent.

FIGURE 7 shows an arrangement similar to that of FIGURE 6, but with the location of the drum 32c and hammer or striker 54' reversed. As shown, the shaft 30c of the drum is fixed at opposite ends to the chains 24c, and the hammer 54' may be carried by a crossbar (not shown) extending between and attached to the braces 38c for striking the flap 50' on the drum. A counterweight 56 is shown at the bottom of drum 32c for continuously urging it to the position thereof shown.

In the embodiment of FIGURES 8–13, a rope 40d extends from a crossbar 52d on the swing to a roller 58 mounted with its shaft 60 journalled in a U-shaped guide brace 62, as best seen in FIGURE 9. Guide brace 62 is shown rigidly attached to brace 38d, which is in turn firmly affixed to a main housing 64, as shown. The main housing 64 is firmly suspended under the transverse bar 28d of the swing frame by a rigid strap 66, with bolts 68 extending through this strap and the bar 28d, these bolts 68 having hooks at their lower ends from which the swing ropes 24d are suspended.

Roller 58 is free to rotate on its shaft 60, while the latter is rotatable in the brace 62 and is drivingly connected to a pulley 70. A ratchet-spring clutch 72, of conventional form, is shown in FIGURE 9 as being provided between shaft 60 and roller 58 whereby rotation of the roller in a clockwise direction, as viewed in FIGURE 10, will be transmitted to shaft 60 through the compression of spring 72 to rotate shaft 60 in the same direction. Rotation of the roller 58 in the opposite direction will not be transferred to the shaft, as is understood.

A tension spring 46" is shown connected at one end to a post 73 set in the bottom of the main housing 64 (see FIGURE 10) and connected at its other end to a short length of rope 74. Rope 74 is connected to roller 58, as shown in FIGURE 8. Hence, as is evident, operation of the swing will effect clockwise rotation of the roller 58 through rope 40d when the swing moves in the direction of arrow A in FIGURE 8, while the spring 46" will effect rotation of the roller in the opposite direction when the swing is moving in the direction of arrow B.

The guide brace 62 has a downward extension terminating in a spool-like structure 62' adapted to prevent rope 40d from striking against the music box 20d, to be later described, when the swing is swung far out in the A direction. Also, by producing a bend in rope 40d, this downward extension at 62' causes a greater rotation of roller 58. And by being flanged like a spool on either side, structure 62' will serve as a guide for the rope 40d.

A drive belt 78 is trained around pulley 70 and extends to a pulley 88 inside the main housing 64, as best seen in FIGURE 11. The horizontal arms of guide brace 62 are shown bolted to brace 38d through slots 80 cut in the horizontal arms of brace 38d. Thus, after belt 78 is in place, it may be conveniently tightened by pulling roller 58 away from the main housing 64 and tightening the bolts 82 in slots 80.

In this embodiment, the roller 58 does not produce the music but effects a storage of energy in a conventional spring motor 84 (shown schematically in FIGURES 11, 12) drivingly connected thereto, and also drivingly connected to the music box 20d. The one-way clutch 72 permits rotary motion, in one direction only, to be transferred from roller 58 to the spring motor 84, in a manner to be evident as the description proceeds; and the spring motor 84 is provided with a speed governor (not shown) for its output shaft 86 whereby a unidirectional motion of constant or uniform speed will be transmitted to the music box. This speed governor may be of any conventional design such as the type used on wind-up phonographic machines to assure constant speed of the output shaft.

Pulley 88 is shown connected to the input shaft 90 of the spring motor 84 by a slip clutch arrangement 92 whereby excessive winding of the spring of motor 84 will be prevented. As best seen in FIGURE 15, this clutch 92 includes a stud 94 which passes loosely through pulley 88. One end of the stud 94 is journalled in the main housing 64, and the other end is threaded into the input shaft 90 of the spring motor. Nuts 96 and 98 are shown locked in position on stud 94 on one side of the pulley 88, with a washer 100 interposed between the pulley and these nuts. A compression spring 102 is held between two washers 104 on the other side of the pulley 88 by the nut 106 which is locked in position on the stud 94 by suitable means, such as a removable pin 108 inserted through aligned holes in the nut and stud. Shown as being arranged within the spring 102 is a cylindrical spacer 110.

Thus, it will be appreciated that as the swing is operated, rotation of roller 58 in a clockwise direction, as viewed in FIGURE 8, will be transferred to the input shaft 90 by means of the one-way clutch 72, the shaft 60, pulleys 70, 88 and slip clutch 92, it being understood that the initial compression of spring 102 will be sufficient to prevent slippage between washer 100, nuts 96, 98, and pulley 88 during the winding up of the spring motor 84. However, when the spring motor is wound to a predetermined degree (depending on the initial compression of spring 102), the spring motor will resist further transmission of rotary motion between pulley 88 and shaft 90 whereby the pulley 88 will then slip or rotate relative to nuts 96 and 98. When the spring in motor 84 thereafter unwinds sufficiently, the compression spring 102 will again operate to transfer rotary motion from pulley 88 to the input shaft 90, as is evident.

As shown in FIGURE 12, the output shaft 86 of the spring motor 84 is drivingly connected by suitable means to the music box 20d. This means includes a pulley 112 mounted on the output shaft 86, a belt 114 running from such pulley to pulley 116 mounted on shaft 118 which is journalled in braces 120 rigidly affixed to and depending from the spring motor 84, as shown. A pulley 122 is also mounted on shaft 118, with a belt 124 running from pulley 122 through a slot in the underside of the main housing 64 to a pulley 126 which is mounted on the input shaft 30d for the music box. Shaft 30d is journalled in braces 128 which extend downwardly from the underside of the main housing 64, as best seen in FIGURES 10 and 12.

The music box 20d may again be of any conventional type which will emit sound of sufficient amplitude. It is shown in FIGURE 13 as including the central shaft 30d drivingly engaged to a continuous belt 130 having projections 132 adapted to strike against the tines 134 of a sound comb whose base 136 is rigidly fastened to one of the walls of the music box, as shown. As will be understood, suitable means will be provided for holding the right-hand end of belt 130, not shown in FIGURE 13, whereby rotation of shaft 30d will effect movement of belt 130 to cause the projections 132 to strike tines 134.

Although this embodiment is not to be considered as being limited to the use of a continuous belt-type music box, it will be appreciated that the use of a continuous belt will allow for the playing of a number of melodies of the same key in succession during the child's operation of the swing. This number is not necessarily limited by the length of the music box since the belt can be lapped in a number of layers around guide rollers inside the music box, as will be understood.

The other end of the music box 20d is shown suspended from the underside of the main housing 64 by a flexible support, such as an elastic strap 138. This strap is shown in FIGURES 10 and 13 as being looped around a bracket 140 and the end of the music box. Bracket 140, together with elastic strap 138 and braces 128 preferably hold the music box 20d at a a short distance below the underside of the main housing 64. This resilient mounting of one end of the music box 20d appears to result in greater sound intensity.

Due to the materials and design of some conventional music boxes, they do not emit sound of sufficient amplitude for outdoor play. FIGURE 14 discloses a sound amplifying arrangement that may be used in such cases. As there shown, a conventional phonograph sound head 141 is rigidly fastened through its needle holding arm 142 to the base 136 of the sound comb. The orifice 144 of the sound head fits through a hole cut in the bottom wall of the music box 20d. Thus when the tines 134 of the sound comb are struck by the projections 132 of the music belt, the vibrations which are induced are transmitted not only to the walls of the music box 20d but also through the arm 142 of the sound head to its diaphragm 146. The vibrations induced in the diaphragm are emitted through the orifice 144, as is understood. In FIGURE 14, the ends of the sound tines 134 have been bent down toward the advancing projections 132. This causes the sound tine to be displaced through a greater arc during the passage of the projection across its end.

A horn 148 is shown which can be connected to the orifice 144 in the hole in the music box through which the orifice extends.

It should be understood that although the music making means described in this embodiment is a music box, the invention encompasses other music making means that can be drivingly connected to the input shaft 90. For instance, the input shaft of a wind-up phonograph could be connected to shaft 90 by an extended belt and pulley system and such phonograph could be fastened at a low level on either of the A-shaped end supports of the swing frame so as to provide for convenient record changing by a child.

It will be appreciated that the attachment of the herein-described embodiments to the transverse bar of the swing supporting frame makes use of holes which are already in such bar for suspension of the swing chains. Therefore, no additional holes need to be made in such bar, as might weaken same.

The embodiment of FIGURES 8–13 has been found to eliminate any distortion of the music emanating from the music box, as might be caused by variation in swing speed during operation. Not only can a swing be operated in a generally fast or slow speed by a child but the speed may vary during each individual cycle that the swing makes. At the center of the arc of swing, the speed is at a maximum; at each end of the arc, it is zero. The spring motor 84 stores this varying available energy and the governor therein assures that it is released to the output shaft 86 at a constant rate to provide for uniform operation of the music box.

As will be realized, the main housing 64 could be extended so as to cover the roller 58 and then all sides of the main housing could be extended downwardly below the level of the guide brace 62 to provide a more compact design, open only at the bottom for downward sound transmission.

It will also be appreciated that the use of a manual drive further adds to the child's enjoyment of the music produced in that he can see that his action is what causes the music.

The particular modification illustrated in FIGURES 16–19 constitutes a refinement of the device previously described and substitutes a flywheel for the spring motor previously described, and also incorporates an improved sound-producing belt mounting whereby more tunes and more melodies may be produced.

Referring now to FIGURES 16–19 and particularly to FIGURE 16, the main housing 64e, in which is mounted the sound-producing device and associated elements, is rigidly secured to the transverse support bar 28e of the swing frame by a rigid strap 66e, in a manner similar to the mounting of the device shown in FIGURE 8, by bolts 68e having hooks at their lower ends by which the swing ropes 24e are suspended. The ropes 24e carry between them a transverse cross-bar 52e at a position below the housing 64e, as in the previous embodiments, and support the customary swing seat 26e. The sound-producing device includes a music box 200 resiliently mounted within the housing 64e by elastic straps 202 secured to one side wall of the housing and to the end walls of the music box. The particular form of music box here described includes a rotatable shaft 204 over which is looped a continuous belt element 208 having a plurality of spaced projections 210 adapted to strike against the tines 212 of a sound-producing comb 214 which is secured rigidly to one of the walls of the music box 200 to produce the desired tune or tunes. The belt 208 is also trained about a rotatable drive shaft 216 journalled in the side walls of the music box and which extends parallel to the rotatable shaft 204. The outer ends of the rotatable drive shaft 216 are journalled, as at 218, in the side walls of the housing 64e and not only affect rotation of the belt 208 but also serve to support the music box 200 within the housing.

A rope 220 is fastened at its center as by a knot to the cross-bar 52e which extends between the swing chains 24e. One end portion 222 of the rope 220 is toward the front of the housing 64e and is passed over rope positioning rollers 224 and 226 affixed to the inside of the front wall of the main housing. The free end of this rope portion 222 is then wound about a roller 228 supported by a rotatable shaft 229 journalled in the side walls of the main housing and extending parallel to the music box drive shaft 216. The free end of the rope portion 222 is passed a few turns about the roller 228 and then is secured thereto at any suitable manner. The other free end portion 230 of the rope 220 extends rearwardly of the housing and is trained over rope positioning rollers 232 and 234 similar to the previously described rope positioning rollers 224 and 226, and then the free end of this portion 230 of the rope is trained a few turns about the roller 228 in the opposite direction as the previously described rope end and is secured to the roller in any suitable fashion.

When the swing moves in the direction indicated by the arrow A, as shown in FIGURE 16, the free end portion 222 of the rope will be unwound from the roller 228, thus effecting counterclockwise rotation of the roller and winding the other rope portion 230 onto the roller 228. When the swing rotates in the opposite direction, or in the direction indicated by the arrow B, the opposite will occur and the rope end portion 230 will unwind from the roller 228, thus effecting clockwise rotation thereof and will cause the winding of the rope end portion 222 onto the roller. It is to be understood that reference to clockwise and counterclockwise rotation described herein is had with reference to looking at the device from the right-hand side of FIGURE 16.

However, to produce satisfactory music from the music box 200 it is required that the drive shaft 216 rotate in one direction only. This is accomplished in the following manner. The counterclockwise motion of roller 228 is transferred to drive shaft 216 by means of a pulley 236 which is rigidly mounted on roller support shaft 229, drive belt 238 and pulley 240 which is slippingly mounted on the rotatable music box drive shaft 216. Between pulleys 236 and 240 the drive belt 238 is reversed in direction by twisting, as shown. This causes the pulley 240 to rotate in a clockwise direction when the pulley 236 rotates in a counterclockwise direction.

FIGURE 17 shows how at the other end of roller 228 the clockwise rotation of this roller is transferred to drive shaft 216 by means of a pulley 236a which is rigidly mounted on shaft 229, a drive belt 238a, and a pulley 240a which is slippingly mounted on drive shaft 216 in the opposite direction from pulley 240.

By mounting pulleys 240 and 240a slippingly on drive shaft 216 and providing each with a friction clutch spring 242 wound around drive shaft 216, the problem of an opposing force being applied to the drive shaft simultaneously with the desired force is next eliminated, as follows. As will be seen from inspection, when pulley 240a is turning clockwise, the spring clutch 242 which is attached to the side of the pulley and wound around the shaft 216 will tighten on the shaft and cause it to rotate clockwise also. At the same time, pulley 240 would exert a counterclockwise force on shaft 216 except that it fits loosely on the shaft and its spring clutch 242 is wound in such a manner that it cannot tighten when it turns counterclockwise around the shaft 216.

The same slipping effect applies to the pulley 240a when the pulley 240 is transferring a clockwise force to the drive shaft 216 on the other side of the music box 200.

As explained above, the need for a spring motor has been eliminated by the use of a simple fly wheel 244. Due to the fact that the speed of a swing varies from a maximum at the center of the arc of curvature to zero at the ends of the arc, a device must be incorporated in the invention which will store up the varying energy and release it to the music making means 200 at an even rate. Otherwise, the music will sound uneven and will be punctuated by a series of undesirable stops. As shown in FIGURE 16, the flywheel 244 is mounted on a shaft 246 which is bearingly journalled into the main housing 64e. The shaft 246 is drivingly connected to drive shaft 216 by means of a pulley 248, belt 250, and a pulley 252. The pulley 248 is much smaller in diameter than the pulley 252 in order to increase the r.p.m. of the flywheel 244 sufficiently so that a lighter weight type of flywheel may be used. The flywheel 244 will not increase the speed of the drive shaft 216 but it will keep it turning at approximately the same constant speed during the slowing down phases of each oscillation until pulley 240 or 240a again exerts a rotative force on drive shaft 216.

FIGURE 18 is a side view showing structure for increasing the number of melodies that can be played by a continuous belt. The sound-producing means can be any device wherein music can be produced from the motion of a rotating shaft. In the present embodiment a mechanical xylophone 260 is shown being played by the continuous belt 208. The number of melodies that can be played has been increased by lapping the belt 208 inversely around spacer wheels 262 which are placed between the two end loops of the belt. This permits getting a large length of belt in a small space. Referring to FIGURE 18, the continuous belt 208 is passed around shaft 264 and the inside of the loop is bent towards the rear and passed inversely over spacer wheels 262 which are mounted on shaft 266. The belt then travels upwards until it passes inversely over additional spacer wheels 262 which are mounted on shaft 268. Then the belt is run forward until it passes over drive shaft 216. From here the other side of the belt runs over shafts 270 and 272 and then back to shaft 264. Shafts 270 and 272 serve to hold this portion of the belt away from that which is running over the spacer wheels 262 and which is thus travelling in the opposite direction. The spacer wheels 262 are preferably of firm rubber and are large enough in diameter so that the projections 210 are prevented from striking on the shafts 266 and 268. This is very important from a noise standpoint if metal rivets and burrs are used to form the belt projections 210.

Shafts 264–272 are all bearingly journalled in the sides of the main housing 64e. If a continuous belt music box were used, all of these shafts, except 216, would be bearingly journalled into the walls of the music box.

FIGURE 19 shows how the belt 208 rides over the spacer wheels (in this illustration, 262). The projections 210 are laid out in such a manner that two clear paths are left to extend the full length of the belt in which the spacer wheels 262 roll without impediment.

The embodiment shown in FIGURE 18 operates generally in the same manner as that described in FIGURES 16 and 17. The oscillating motion of the swing is converted to rotating motion as before. This causes the continuous belt 208 to move and projections 210 to depress the near ends 274 of hammers 276 which are pivoted about shaft 278. The striking ends 282 of the hammers are deflected upwards and fall back down on the plates of the xylophone 284 producing musical notes. When at rest, the striking ends 282 of the hammers are held just above the xylophone plates by a strip of sponge rubber 286 affixed on top of a rigid support which runs across the inside of the main housing 64e perpendicular to the lengths of the hammers 276. The sponge rubber 286 serves to raise the striking ends 282 of the hammers 276 away from the xylophone plates 284 immediately after impact, thus preventing the deadening effect that occurs otherwise.

It thus will be seen that the objects of this invention have been fully and effectively accomplished. It will be realized, however, that the foregoing specific embodiments have been described only for the purpose of illustrating the principles of this invention and are subject to extensive change without departure from such principles. Therefore, this invention includes all modifications encompassed within the spirit and scope of the following claims.

I claim:
1. A musical swing comprising: a fixed support; swing structure providing a seat for children depending from said support for oscillatory movement with respect thereto; a sound-producing mechanism fixedly attached to said support; said sound-producing mechanism having a rotary operating element connected thereto; and means including a one way clutch and an energy storage device drivingly connecting said swing structure to said rotary operating element to translate swinging motion of said structure by a child swinging thereon into substantially constant speed rotation of said operating element irrespective of the speed or frequency of oscillation of said seat.

2. A musical swing as defined in claim 1, wherein said energy storage device is a speed governed spring motor.

3. A musical swing as defined in claim 1, wherein said energy storage device is a speed governing fly wheel.

4. A musical swing as defined in claim 1, wherein said sound-producing mechanism is a music box.

5. A musical swing as defined in claim 1, wherein said sound-producing mechanism is a music box having sound-amplifying means operatively engaged thereto.

References Cited in the file of this patent

UNITED STATES PATENTS

| | | |
|---|---|---|
| 407,697 | Sommer | July 23, 1889 |
| 470,610 | Wolff | Mar. 8, 1892 |
| 1,547,183 | Steele | July 28, 1925 |
| 1,749,081 | Marx | Mar. 4, 1930 |
| 1,876,753 | Reuge | Sept. 13, 1932 |
| 2,550,991 | Goodman et al. | May 1, 1951 |

FOREIGN PATENTS

| | | |
|---|---|---|
| 300,983 | Switzerland | Nov. 1, 1954 |